United States Patent
Goldman

(10) Patent No.: US 10,859,214 B2
(45) Date of Patent: Dec. 8, 2020

(54) APPARATUS AND METHODS FOR RETROFITTING INCANDESCENT LUMINAIRE FIXTURES PRINCIPALLY FOR USE IN SWIMMING POOLS AND SPAS

(71) Applicant: Zodiac Pool Systems LLC, Carlsbad, CA (US)

(72) Inventor: David Goldman, Carlsbad, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 0 days.

(21) Appl. No.: 16/679,891

(22) Filed: Nov. 11, 2019

(65) Prior Publication Data

US 2020/0158294 A1 May 21, 2020

Related U.S. Application Data

(60) Provisional application No. 62/767,681, filed on Nov. 15, 2018.

(51) Int. Cl.
*F21K 9/235* (2016.01)
*F21V 29/70* (2015.01)
*F21V 31/00* (2006.01)
*F21Y 115/10* (2016.01)

(52) U.S. Cl.
CPC .............. *F21K 9/235* (2016.08); *F21V 29/70* (2015.01); *F21V 31/00* (2013.01); *F21Y 2115/10* (2016.08)

(58) Field of Classification Search
CPC ........... F21K 9/235; F21V 29/70; F21V 31/00
See application file for complete search history.

(56) References Cited

U.S. PATENT DOCUMENTS

2002/0149941 A1  10/2002  Mateescu et al.
2006/0187652 A1*  8/2006  Doyle ...................... F21S 2/00
                                                                362/96

* cited by examiner

*Primary Examiner* — Thomas M Sember
(74) *Attorney, Agent, or Firm* — Kilpatrick Townsend & Stockton LLP; Dean W. Russell; Renae B. Wainwright

(57) ABSTRACT

Lighting assemblies principally for swimming pools and/or spas are disclosed herein, as well as related methods. The assemblies may be used to retrofit incandescent luminaires with light emitting diodes (LEDs). No need exists to move (or remove) elongated power cords associated with the luminaires, nor to replace any Edison-style plugs of the luminaires.

22 Claims, 8 Drawing Sheets

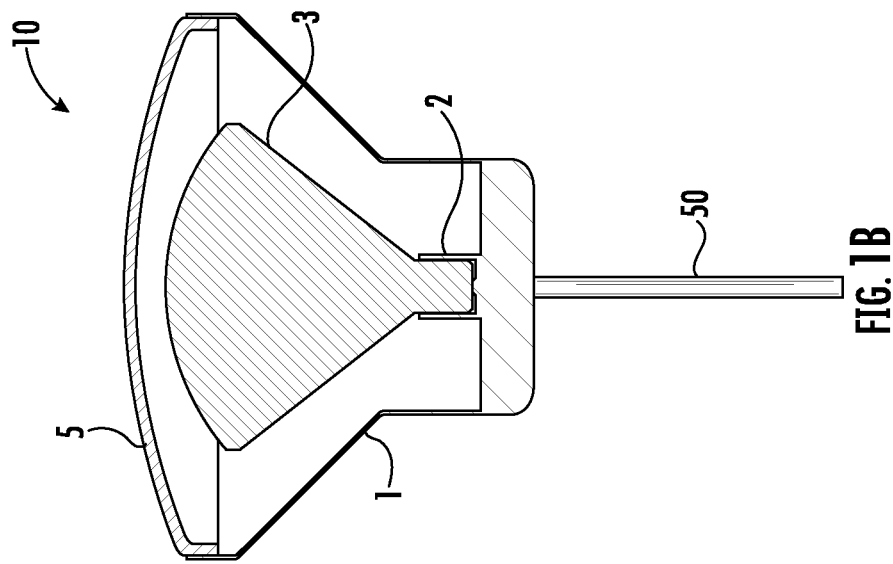
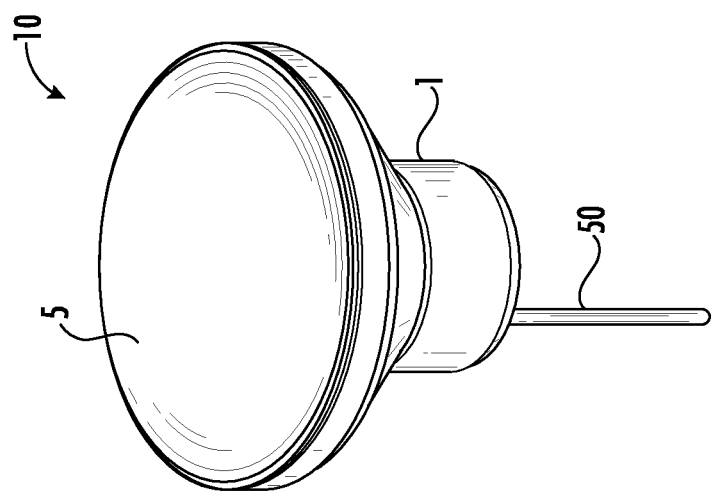
FIG. 1A
FIG. 1B

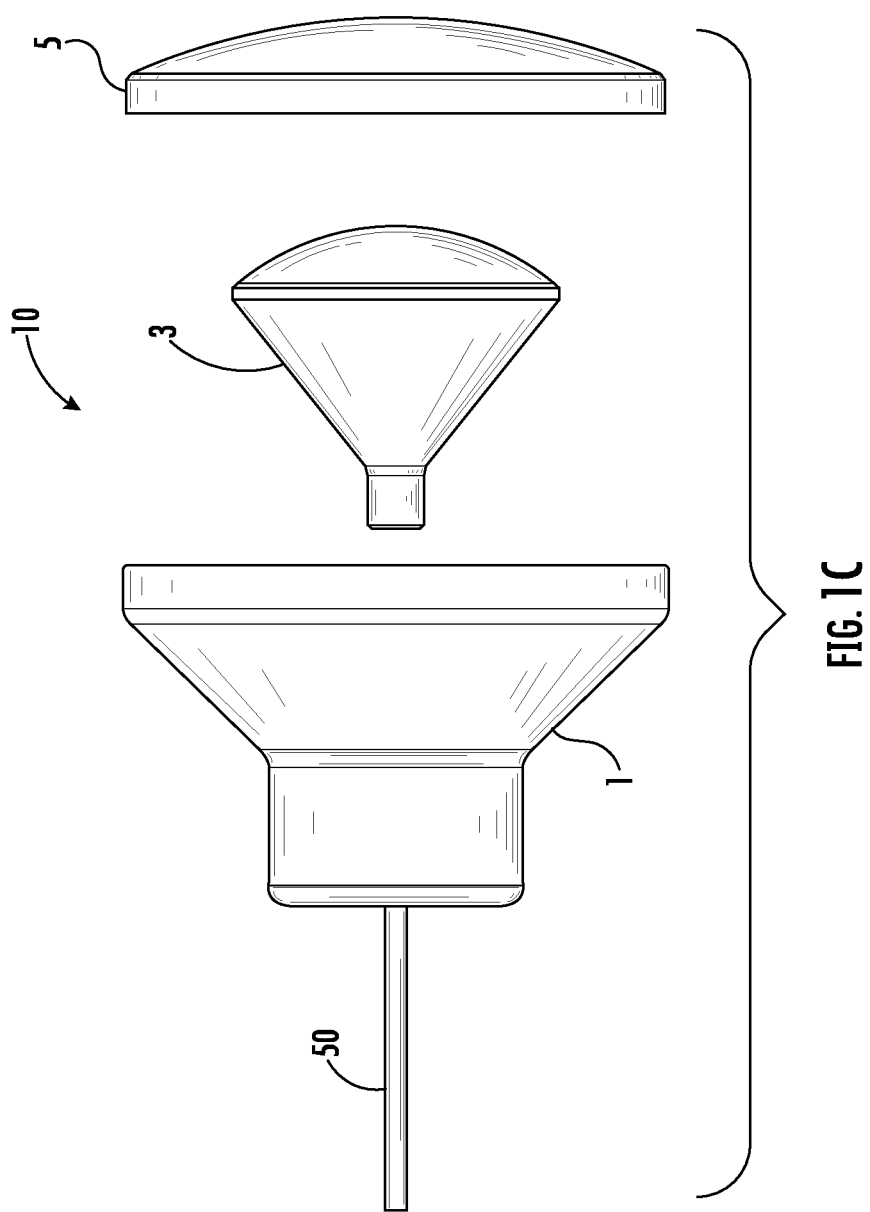

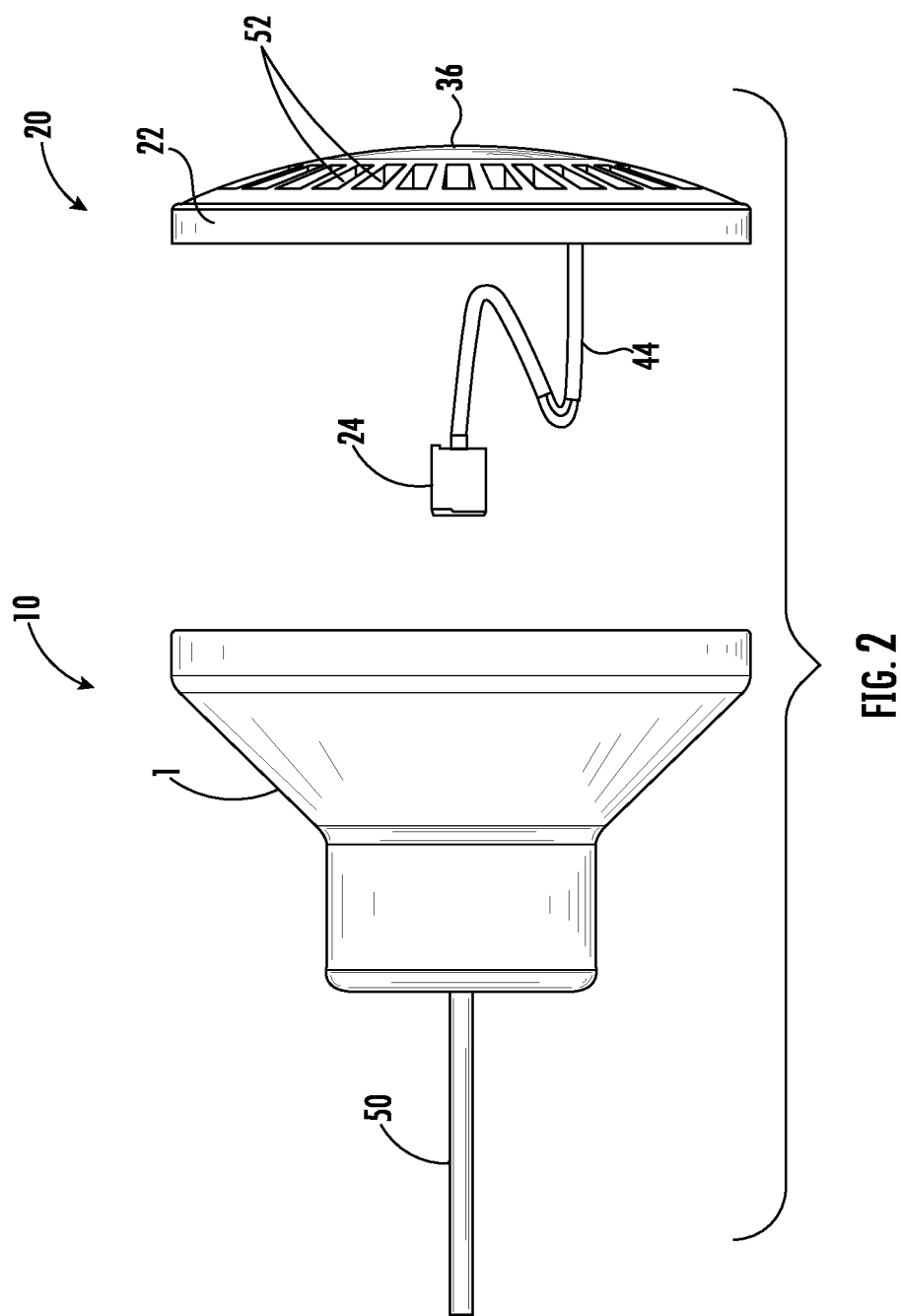

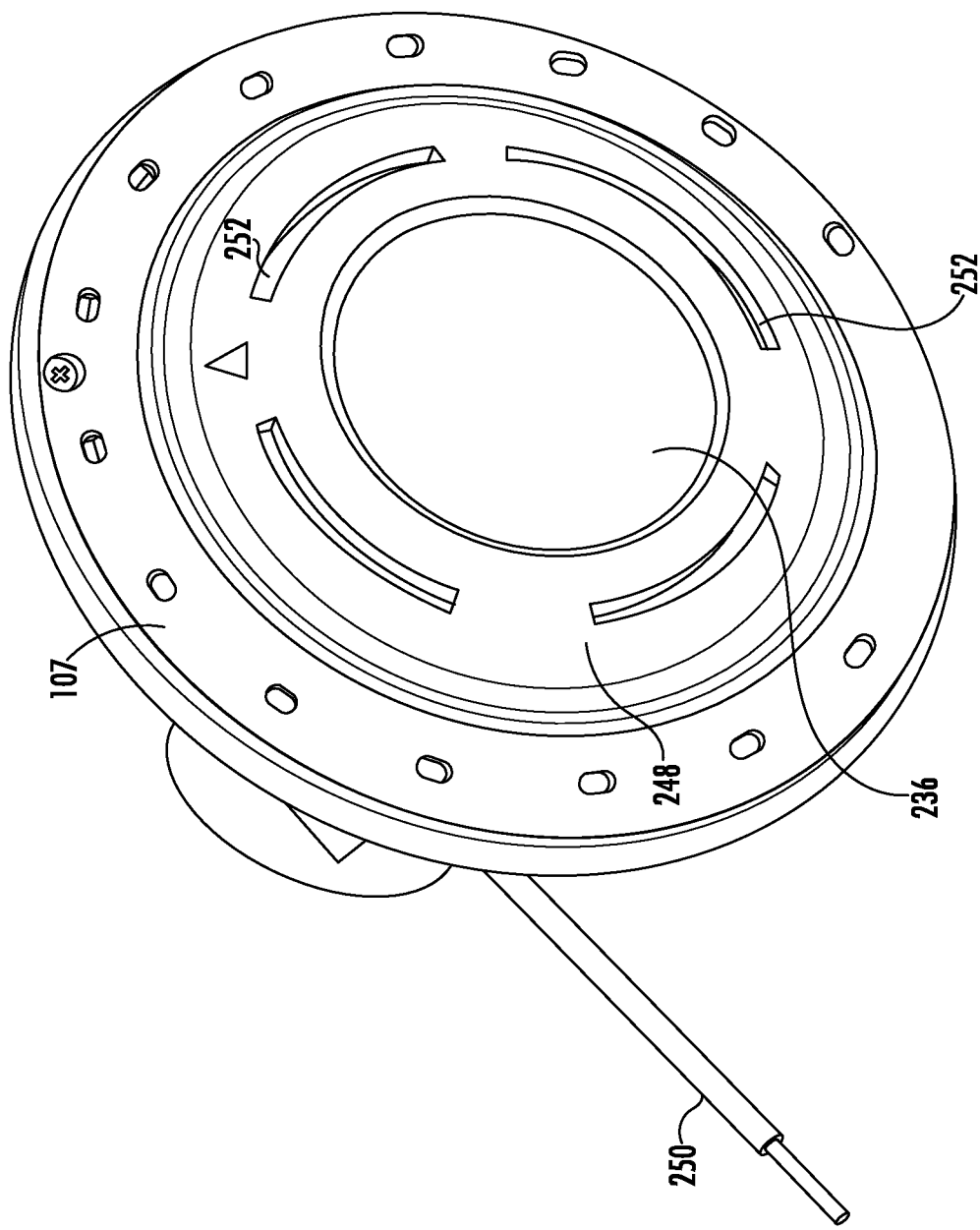

APPARATUS AND METHODS FOR RETROFITTING INCANDESCENT LUMINAIRE FIXTURES PRINCIPALLY FOR USE IN SWIMMING POOLS AND SPAS

REFERENCE TO RELATED APPLICATION

This application claims the benefit of U.S. Provisional Application No. 62/767,681, filed on Nov. 15, 2018 and entitled Apparatus and Methods for Retrofitting Incandescent Luminaire Fixtures Principally for use in Swimming Pools and Spas, the entire contents of which are hereby incorporated by reference.

FIELD OF THE INVENTION

This invention relates to lighting assemblies and more particularly, but not necessarily exclusively, to equipment for retrofitting certain existing luminaire fixtures in swimming pools and spas.

BACKGROUND OF THE INVENTION

Submersible lighting is popular among owners of water-containing vessels such as swimming pools and spas. These lights often enhance aesthetics of the pools or other vessels. They also may improve overall safety of the pools, illuminating the water and potentially increasing visibility of swimmers, especially at night.

U.S. Patent Application Publication No. 2002/0149941, of Mateescu, et al., details one of many existing possibilities for underwater lighting fixtures. A fixture of the Mateescu application may be configured for installation in a recess in the wall of a swimming pool and contain at least one incandescent lamp within a housing. A power cord may attach to a retainer or receptacle for the lamp and extend from the housing through an opening of the fixture, sealed by a grommet. See Mateescu, p. 2, ¶0025. The power cord typically will be elongated and routed through conduit to a power supply remote from the pool.

FIGS. 1A-1C and FIG. 5 illustrate other incandescent lighting assemblies 10 and 100 typical of those currently used in swimming pools. Each of lighting assemblies 10, 100 may include, respectively, a housing 1, 101 and incandescent light bulb 3, 103. A base of bulb 3, 103 is fitted into an Edison-style receptacle 2, 102 within housing 1, 101, and a power cord (50 in FIGS. 1A-1C) supplies electricity to receptacle 2, 102. Also depicted in FIGS. 1A-1C and FIG. 5 is lens 5, 105.

Also depicted in FIG. 5 are gasket 104, lens 5, and clamping assembly 106. Clamping assembly 106, when connected using suitable fasteners (such as fasteners 108-109), compresses gasket 104 between lens 105 and housing 101. Trim ring 107 of lighting assembly 100, which may project into the pool, covers part of clamping assembly 106 for cosmetic or aesthetic purposes.

Light emitting diodes (LEDs) may be more reliable, energy efficient, and brighter than incandescent bulbs. More recently, therefore, pool owners have preferred to replace the incandescent bulbs of their lighting systems with LEDs. Replacement conventionally requires "pulling the light," removing both the luminaire and the permanently attached, elongated cord. Doing so can be difficult and, at times, can damage the cord.

Receptacles for incandescent bulbs additionally are not optimized to receive LEDs. The receptacles are not normally designed to remove heat from the bulbs and are positioned at a distance from the water of the pool or spa, so alternative methods must be employed to accommodate LEDs. In particular, the LEDs may need to use finned heat sinks (or similar structures) to transfer internal heat to the surrounding air within the housings. Although heat may further be transferred from the surrounding air to the water-cooled metal housing of the luminaires, the transfer is inefficient because air is a poor thermal conductor.

Consequently, existing LED retrofits are often less than desirable. In some systems, lower brightness LEDs are intentionally utilized so as to reduce the generated heat to acceptable levels. In others, higher brightness LEDs are retained but at the cost of lower reliability and longevity as the greater heat output damages the lights over time.

SUMMARY OF THE INVENTION

The present invention seeks to resolve issues associated with retrofitting existing luminaires. "Pulling the light" no longer is necessary, nor is replacing the receptacle of the bulb. Instead, an LED assembly may substitute for an incandescent bulb and include both an adaptor for fitting into an existing receptacle and a thermally-conductive surface to facilitate heat transfer to water of the pool or spa.

In some versions of the invention, all components of lighting assembly 10, 100 may be maintained except incandescent bulb 3, 103 and lens 5, 105. Instead, a retrofit luminaire comprising one or more LEDs, an Edison-style plug, and a (short) cord connecting the two may be used. Geometry of the retrofit assembly is such that, if used, gasket 104 and clamping assembly 106 of lighting assembly 100 may continue to function normally notwithstanding that internal heat may be transferred resourcefully to water of the pool.

It thus is an optional, non-exclusive object of the present invention to provide lighting assemblies, preferably for swimming pools and spas.

It is another optional, non-exclusive object of the present invention to provide apparatuses and methods for retrofitting incandescent luminaire fixtures with LEDs.

It is a further optional, non-exclusive object of the present invention to provide retrofitting techniques that do not require pulling elongated cords through conduits.

It is, moreover, an optional, non-exclusive object of the present invention to provide luminaires with heat-transfer surfaces proximate the LEDs and the water of pools or spas and useful to conduct heat from the LEDs to the water of the pools or spas.

Other features, objects, and advantages of the present invention will be apparent to those skilled in the appropriate art with reference to the remaining text and drawings of this application.

BRIEF DESCRIPTION OF THE DRAWINGS

FIG. 1A is a perspective view of a typical existing incandescent lighting assembly.

FIG. 1B is a cross-sectional view of the incandescent lighting assembly of FIG. 1A.

FIG. 1C is an exploded view of the incandescent lighting assembly of FIG. 1A.

FIG. 2 is a perspective view of an exemplary luminaire or lighting assembly according to an embodiment of the present invention positioned relative to portions of the incandescent lighting assembly of FIG. 1A.

FIG. 8 is a pool-side perspective view of the lighting assembly of FIGS. 6-7.

DETAILED DESCRIPTION

Figure 3:
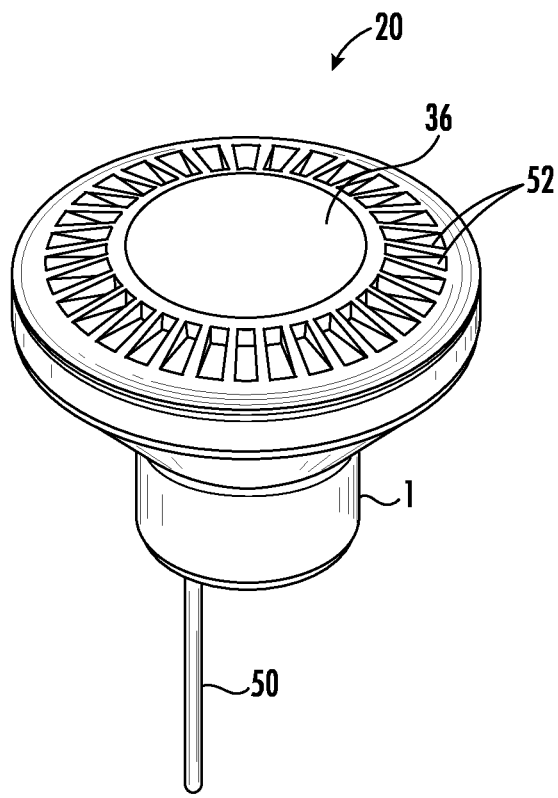
FIG. 3 is a perspective view of the luminaire or lighting assembly of FIG. 2 assembled with portions of the incandescent lighting assembly of FIG. 1A.
Figure 4:
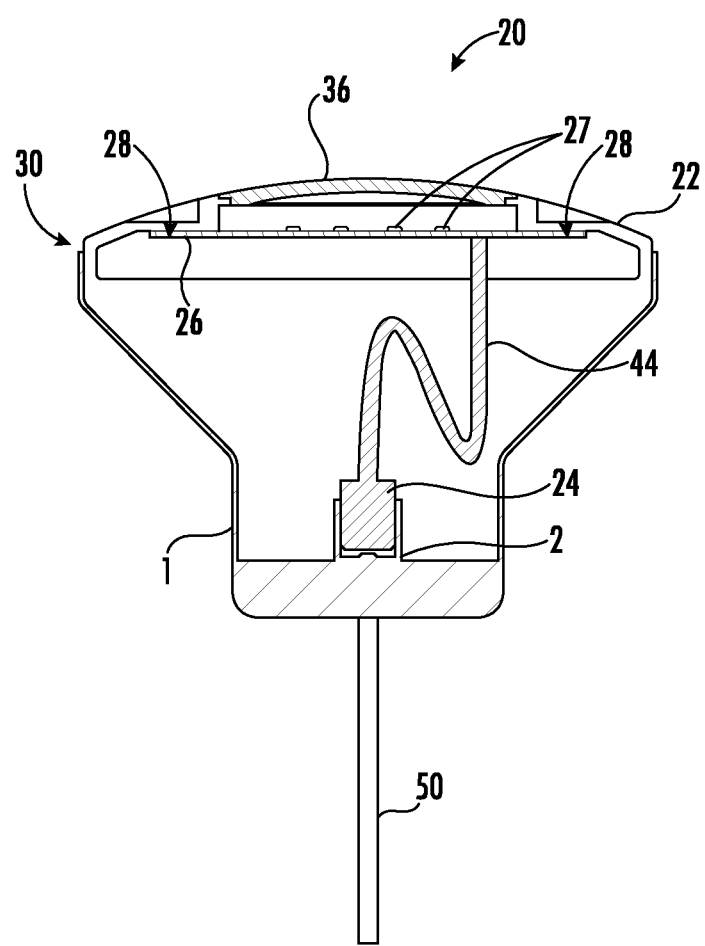
FIG. 4 is a cross-sectional view of the luminaire or lighting assembly of FIG. 2 assembled with portions of the incandescent lighting assembly of FIG. 1A.

Illustrated in FIGS. 2-4 is exemplary lighting assembly 20. Lighting assembly 20 may comprise a cover 22, a base 24, a printed circuit board (PCB) 26 with LEDs 27, and an internal cord 44 interconnecting base 24 and PCB 26. In some embodiments of lighting assembly 20, base 24 is an Edison-style plug configured to connect directly to receptacle 2 (such as the receptacle of the existing incandescent lighting assembly to be retrofit with lighting assembly 20), allowing an existing such receptacle 2 to be maintained.

The lighting assembly 20 also includes a heat transfer surface that allows heat from the LEDs 27 and electronics of PCB 26 to transfer to surrounding pool or spa water. In some examples, the heat transfer surface may be a thermal paste, coating, or other thermal transfer material applied in any suitable arrangement, such as a thermally conductive material in a heat sink arrangement, to a portion of the PCB 26. In some cases, a front of the heat transfer surface faces into (and may contact) the pool or spa water, and the rear of the heat transfer surface contacts the PCB 26. In some examples, the periphery of PCB 26 (such as at areas 28 in FIG. 4) may serve as the heat transfer surface, or the heat transfer surface may be included on the periphery of PCB 26. A heat transfer interface, such as a thermal contact path, may connect the LEDs 27 and other electronics of the PCB 26 with the heat transfer surface. In this way, the lighting assembly 20 is configured such that one or more thermally conductive surfaces are in physical contact with the surrounding pool or spa water and in thermal contact with the LEDs 27 and other electronics of the PCB 26 to facilitate conductive heat transfer from the LEDs 27 and electronics of the PCB 26 to the surrounding water.

As described in more detail below in connection with the embodiment of FIGS. 6-8, the lighting assembly may have alternative or additional components to facilitate conductive heat transfer, such as a plate or other surfaces. As illustrated in FIG. 4, the lighting assembly 20 may have a sealing area 30 to isolate the base 24, internal cord 44 and receptacle 2 from contact with the surrounding water. In some examples, the LEDs 27 and associated control electronics of the PCB 26 are also isolated from surrounding water. For example, lens 36 may help isolate the LEDs 27 and electronics of PCB 26 from contact with surrounding water.

As shown in FIGS. 2-4, existing power cord 50 also may be maintained. Power cord 50 thus may continue to supply electricity to the LEDs 27 and associated electronics. It may do so by supplying power to receptacle 2, into which base 24 is fitted, with electricity then being conveyed via internal cord 44 to the PCB 26. By utilizing internal cord 44, the PCB 26 and associated LEDs 27 are able to positioned adjacent the surrounding water (and spaced apart from the receptacle 2), enabling effective heat transfer from the LEDs into the water.

Internal cord 44 is also advantageously used in some embodiments of lighting assembly 20 because the LEDs typically are smaller than the incandescent bulb 3 which they replace. Internal cord 44 need not always be necessary, however. Instead, lighting assembly 20 may be configured differently so that no internal cord 44 is required, for example, or so as to establish a direct connection with receptacle 2 or power cord 50.

As illustrated in FIGS. 2-3, cover 22 may include one or more openings, such as slots 52, allowing water to flow therethrough to further facilitate heat transfer from the perimeter of PCB 26 to the water of the pool or spa.

Thus, lighting assembly 20 may form part of a structure for retrofitting certain incandescent lighting assemblies 10 with LEDs such as LEDs 27. Much of lighting assembly 10 may be maintained during the retrofit process; in particular, an existing power cord 50 may be maintained, as no need to "pull the light" exists. As described above, lighting assembly 20 additionally may be configured so the LEDs are positioned proximate the surrounding water to facilitate heat transfer away from the LEDs and associated electronics, prolonging their useful lives.

Figure 6:
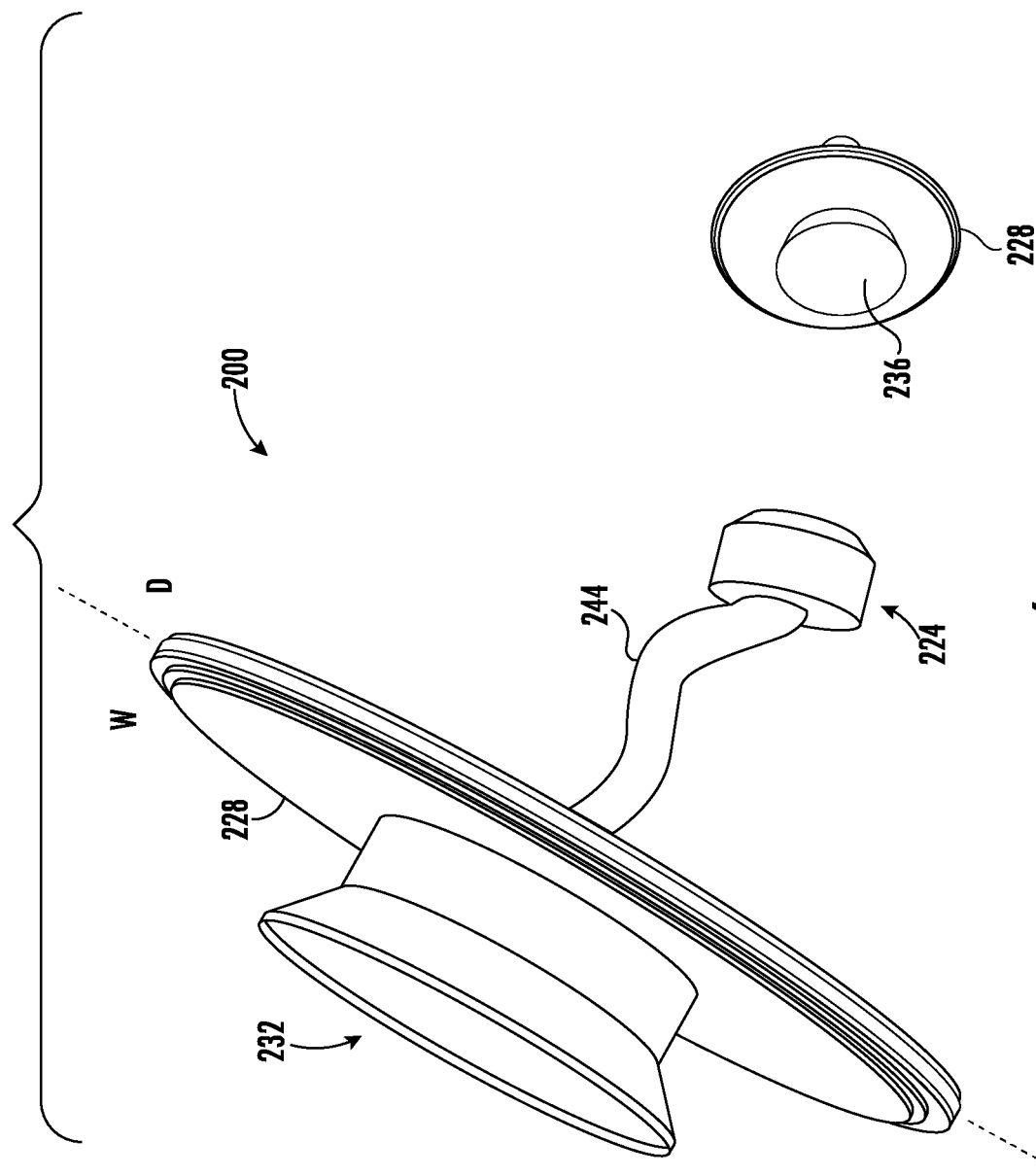
FIG. 6 is a perspective view of an exemplary luminaire or lighting assembly according to another embodiment of the present invention.
Figure 7:
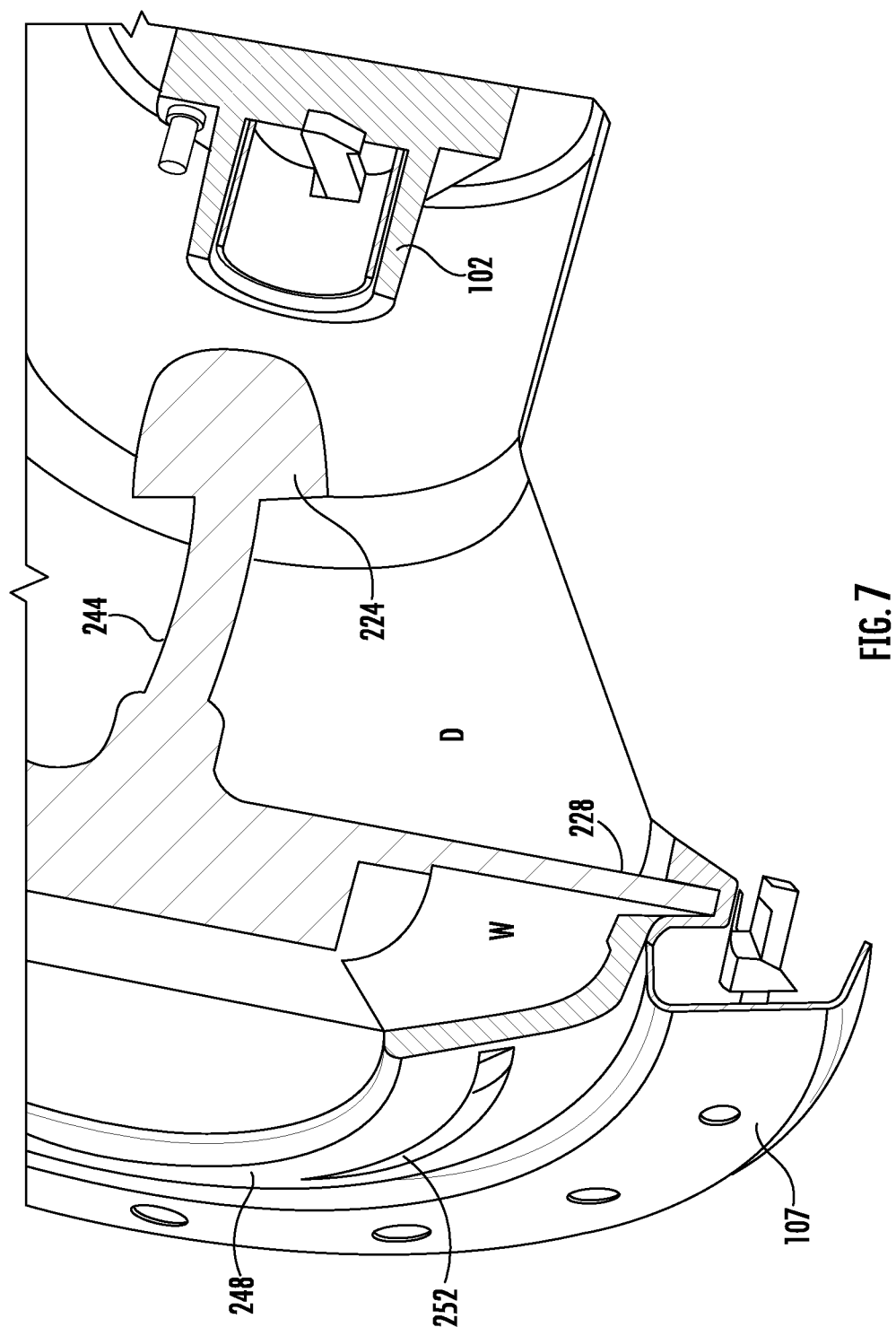
FIG. 7 is a perspective view of portions of the lighting assembly of FIG. 6 together with an optional trim ring.

Illustrated in FIGS. 6-8 is another exemplary lighting assembly 200 of the present invention. Lighting assembly 200 may comprise base 224, plate 228, and internal cord 244 interconnecting base 224 and plate 228. In some embodiments of lighting assembly 200, base 224 is an Edison-style plug configured to connect directly to receptacle 2, 102 (such as the receptacle of the existing incandescent lighting assembly to be retrofit with lighting assembly 200), allowing an existing such receptacle 2, 102 to be maintained.

Figure 5:
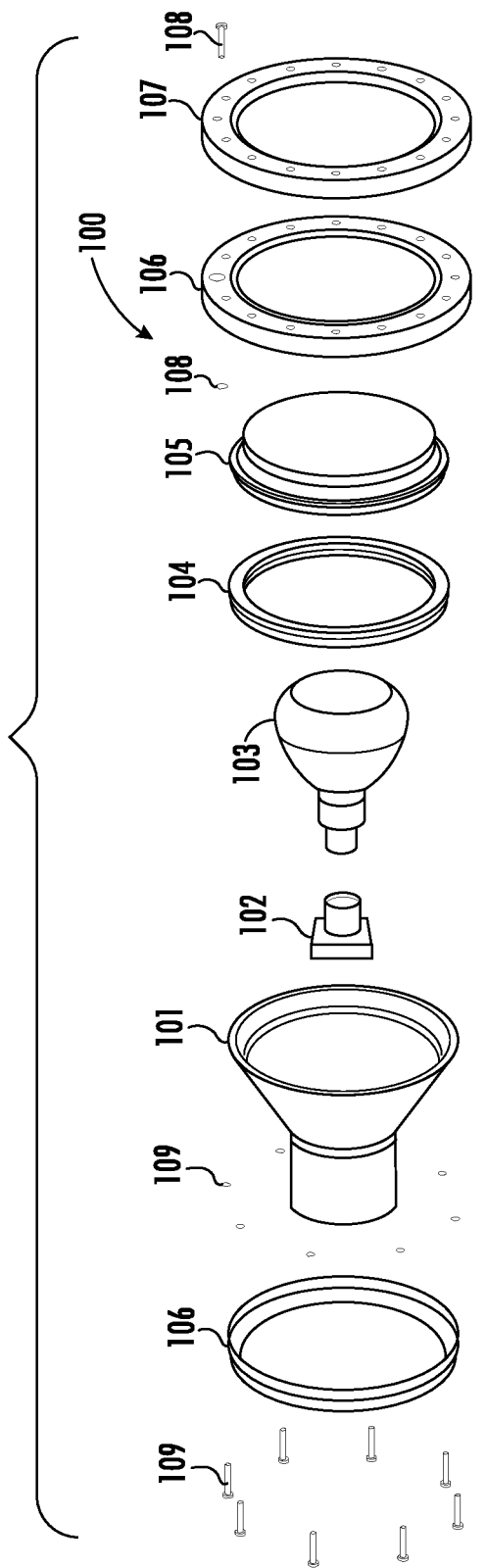
FIG. 5 is an exploded view of another typical existing incandescent lighting assembly.

Plate 228 may be made of any suitable material. In some embodiments, plate 228 is designed to assist with heat transfer from the LEDs to the surrounding pool water and therefore is preferably thermally conductive. Plate 228 additionally may form the boundary between "dry" side D and "wet" side W of lighting assembly 200. As shown in FIG. 6, at least one version of plate 228 may have a circular cross-section and be configured geometrically to have size and shape similar to a lens (such as lens 105 of FIG. 5) which it may replace. Extending from plate 228 may be recess 232 in which one or more LEDs and associated control electronics may be positioned. The plate 228 may be proximate the LEDs 27 and other electronics of the PCB 26, and a heat transfer interface, such as a thermal contact path, may connect the LEDs 27 and other electronics of the PCB 26 with the plate 228. In this way, the lighting assembly 200 is configured such that the plate 228 is in physical contact with the surrounding pool or spa water and in thermal contact with the LEDs 27 and other electronics of the PCB 26 to facilitate conductive heat transfer from the LEDs 27 and electronics of the PCB 26 to the surrounding water. In some embodiments, a front surface of the plate 228 contacts the water and a rear surface of the plate 228 contacts the PCB 26. Lens 236 (see also FIG. 8) may cover recess 232 so as to isolate the LEDs and electronics from contact with surrounding water.

Depicted in FIG. 8 is that existing power cord 250 also may be maintained. Power cord 250 thus may continue to supply electricity to the LEDs and associated electronics. It may do so by supplying power to receptacle 102, into which base 224 is fitted, with electricity then being conveyed via internal cord 244.

Internal cord 244 is advantageously used in some embodiments of lighting assembly 200 because the LEDs typically are smaller than the incandescent bulb 103 which they replace, and to allow the LEDs to be positioned proximate the surrounding pool water to effect heat transfer. Internal cord 244 need not always be necessary, however. Instead, lighting assembly 200 may be configured differently so that no internal cord 244 is required, for example, or so as to establish a direct connection with receptacle 102 or power cord 250.

FIGS. 7-8 also illustrate that existing trim ring 107 may be maintained in connection with lighting assembly 200. Moreover, an optional inner trim piece 248 may be employed if desired. Trim piece 248 may include one or more openings, such as slots 252, allowing water to flow therethrough in order to facilitate heat transfer from plate 228 to the water of the pool or spa. Trim piece 248 also may fit against lens 236 to retain its position once clamping assembly 106 is utilized. Appropriate fasteners of clamping assembly 106 may serve to clamp all of lighting assembly 200, the LEDs and electronics, lens 236, inner trim piece 248, housing 101, and trim ring 107 together.

Thus, lighting assembly 200 may form part of a structure for retrofitting certain incandescent lighting assemblies, such as lighting assemblies 10 and 100, with LEDs. Much of a lighting assembly 10 or lighting assembly 100 may be maintained during the retrofit process; in particular, an existing power cord 50 or 250 may be maintained, as no need to "pull the light" exists. Lighting assembly 200 additionally may be configured so at least one thermally conductive surface is positioned in contact with the surrounding pool or spa water and proximate the LEDs to facilitate heat transfer away from the LEDs and associated electronics, prolonging their useful lives.

The entire contents of the Mateescu application are incorporated herein by this reference. Further, although applicant has described lighting assemblies for use principally in retrofitting incandescent assemblies of swimming pools and spas, persons skilled in the relevant field will recognize that the present invention may, in appropriate circumstances, be employed in manners other than those expressly identified herein. Finally, references to "pools" and "swimming pools" herein may also refer to spas or other water containing vessels used for recreation or therapy and as to which lighting is needed or desired.

The invention claimed is:

1. An immersible, LED-containing lighting assembly useful in swimming pools or spas and comprising:
a printed circuit board comprising a thermally conductive surface for transferring heat from LEDs of the printed circuit board and associated electronics to water of the swimming pools or spas, wherein a front of the thermally conductive surface faces into the swimming pools or spas and contacts the water of the swimming pools or spas and wherein the thermally conductive surface is in thermal contact with the LEDs; and
a lens that covers the thermally conductive surface of the printed circuit board, wherein the thermally conductive surface is arranged to transfer the heat from the LEDs to the water directly without passing through the lens, and
wherein the immersible, LED-containing lighting assembly is configured to isolate an area containing the LEDs from contact with the water so that the heat transfer only occurs at a periphery of the printed circuit board.

2. The immersible, LED-containing lighting assembly of claim 1, further comprising an Edison-style bulb-receiving base electrically coupled with the LEDs, wherein the Edison-style bulb-receiving base is spaced apart from the LEDs and electrically coupled with the LEDs via an internal cord.

3. The immersible, LED-containing lighting assembly of claim 1, wherein the thermally conductive surface is a plate.

4. The immersible, LED-containing lighting assembly of claim 3, wherein the LEDs are housed within a recess extending from the plate.

5. The immersible, LED-containing lighting assembly of claim 1, wherein the thermally conductive surface is the periphery of a printed circuit board on which the LEDs are mounted or the thermally conductive surface is a material on the periphery of the printed circuit board.

6. The immersible, LED-containing lighting assembly of claim 5, wherein the thermally conductive surface is the material and the material is a thermal paste or coating.

7. The immersible, LED-containing lighting assembly of claim 1, wherein the lens isolates the LEDs from contact with the water.

8. An LED lighting assembly retrofittable into an existing incandescent lighting assembly, wherein the LED lighting assembly comprises:
an Edison-style bulb-receiving base and one or more LEDs electrically coupled with the Edison-style bulb-receiving base, wherein the one or more LEDs are spaced apart from the Edison-style bulb-receiving base and electrically coupled with the Edison-style bulb-receiving base via an internal cord; and
a printed circuit board comprising a thermally conductive surface for transferring heat from the one or more LEDs of the printed circuit board and associated electronics to water of swimming pools or spas, wherein a front of the thermally conductive surface faces into the swimming pools or spas and contacts the water of the swimming pools or spas and wherein a rear of the thermally conductive surface contacts a printed circuit board on which the one or more LEDs are mounted; and
a lens that covers the thermally conductive surface of the printed circuit board, wherein the thermally conductive surface is arranged to transfer the heat from the one or more LEDs to the water directly without passing through the lens, and
wherein the LED lighting assembly is configured to isolate an area containing the one or more LEDs from contact with the water so that the heat transfer only occurs at a periphery of the printed circuit board.

9. The LED lighting assembly of claim 8, wherein a heat transfer interface connects the one or more LEDs and associated electronics with the thermally conductive surface.

10. The LED lighting assembly of claim 8, wherein the thermally conductive surface is a plate.

11. The LED lighting assembly of claim 10, wherein the one or more LEDs are housed within a recess extending from the plate.

12. The LED lighting assembly of claim 8, wherein the thermally conductive surface is a thermal paste or coating on the periphery of the printed circuit board.

13. The LED lighting assembly of claim 8, wherein the lens isolates the one or more LEDs and associated electronics from contact with the water.

14. The LED lighting assembly of claim 8, further comprising a cover having one or more openings for facilitating heat transfer from the one or more LEDs to the water.

15. A method of replacing an incandescent bulb of an immersible luminaire fixture with one or more LEDs while retaining an original power cord of the immersible luminaire fixture, wherein the method comprises:
   providing a printed circuit board on which the one or more LEDs are mounted and comprising a thermally conductive surface to facilitate heat transfer from the one or more LEDs to water of swimming pool or spa, wherein the thermally conductive surface of the printed circuit board is arranged to transfer the heat from the one or more LEDs to the water directly without passing through a lens of the immersible luminaire fixture,
   wherein a front of the thermally conductive surface faces into the swimming pool or spa and contacts the water of the swimming pool or spa and wherein a rear of the thermally conductive surface contacts the printed circuit board on which the one or more LEDs are mounted, and
   wherein the immersible luminaire fixture is configured to isolate an area containing the one or more LEDs from contact with the water so that the heat transfer only occurs at a periphery of the printed circuit board.

16. The method of claim 15, the method comprising:
electrically coupling the one or more LEDs with an original Edison-style bulb-receiving base of the immersible luminaire fixture, wherein the original Edison-style bulb-receiving base is electrically coupled with the original power cord and wherein the original Edison-style bulb-receiving base is spaced apart from the one or more LEDs and electrically coupled with the one or more LEDs via an internal cord.

17. The method of claim 15, wherein the thermally conductive surface is a plate.

18. The method of claim 15, wherein the thermally conductive surface contacts the periphery of the printed circuit board.

19. A method of replacing an incandescent bulb of an immersible luminaire fixture with one or more LEDs mounted on a printed circuit board while retaining an original Edison-style bulb-receiving base of the immersible luminaire fixture, wherein the one or more LEDs are positioned proximate water of a swimming pool or spa to facilitate heat transfer from the one or more LEDs to the water of the swimming pool or spa directly without passing through a lens of the immersible luminaire fixture, and wherein the immersible luminaire fixture is configured so an area containing the one or more LEDs is isolated from contact with the water so that the heat transfer only occurs at a periphery of the printed circuit board.

20. The method of claim 19, further comprising providing a thermally conductive surface, wherein a front of the thermally conductive surface faces into the swimming pool or spa and contacts the water of the swimming pools or spas and wherein a rear of the thermally conductive surface contacts the printed circuit board on which the one or more LEDs are mounted.

21. The method of claim 19, further comprising retaining an original power cord of the immersible luminaire fixture while replacing the incandescent bulb with the one or more LEDs.

22. The method of claim 19, further comprising electrically coupling, via an internal cord, the one or more LEDs with the original Edison-style bulb-receiving base.

\* \* \* \* \*